(12) United States Patent
Diemer et al.

(10) Patent No.: US 8,634,996 B2
(45) Date of Patent: Jan. 21, 2014

(54) METHOD OF COOLING A DUAL CLUTCH TRANSMISSION

(75) Inventors: Larry D. Diemer, Clarkston, MI (US); Scott William Heitzenrater, Orion, MI (US); James M. Partyka, Clarkston, MI (US); Victor M. Roses, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 665 days.

(21) Appl. No.: 12/892,013

(22) Filed: Sep. 28, 2010

(65) Prior Publication Data
US 2012/0078480 A1    Mar. 29, 2012

(51) Int. Cl.
*G06F 7/00* (2006.01)
(52) U.S. Cl.
USPC .............. 701/60; 701/51; 701/67; 192/85.48; 477/39; 477/72

(58) Field of Classification Search
USPC ........ 701/51, 52, 60, 67, 68; 192/3.32, 70.28, 192/85.48; 477/5, 39, 72
See application file for complete search history.

(56) References Cited

U.S. PATENT DOCUMENTS

2007/0259748 A1* 11/2007 Forsyth ............................ 475/5

* cited by examiner

*Primary Examiner* — Gertrude Arthur Jeanglaude
(74) *Attorney, Agent, or Firm* — Quinn Law Group, PLLC

(57) ABSTRACT

A method of cooling a dual clutch transmission is provided. The transmission has first and second input clutches alternately engagable to transfer torque to an output member along first and second input shafts, respectively, at various speed ratios dependent upon engagement of synchronizers. The method includes determining a currently established speed ratio by determining which of the input clutches and synchronizers are currently engaged and which of the input clutches and synchronizers are currently open. One of the open synchronizers is then engaged during the currently established speed ratio to cause the open input clutch to rotate at a speed greater than the speed of rotation of the engaged input clutch, thereby creating a fan cooling effect.

11 Claims, 3 Drawing Sheets

METHOD OF COOLING A DUAL CLUTCH TRANSMISSION

TECHNICAL FIELD

The invention relates to a control strategy for a dual clutch transmission to improve cooling.

BACKGROUND

A typical multi-speed, dual clutch transmission uses a combination of two friction plate input clutches and several dog clutch/synchronizers to achieve "power-on" or dynamic shifts by alternating between one friction clutch and the other, with the synchronizers being preselected for the next expected gear (prior to actually making the dynamic shift). Heat generated at the input clutches raises the temperature of the friction plates. The input clutches must be of a large enough size and/or must be controlled to remain on for only a given amount of time in order to maintain the temperature of the friction plates below a predetermined maximum operating temperature.

SUMMARY

A method of cooling a dual clutch transmission is provided that enables cooling of the friction input clutches during normal operation of the transmission, potentially enabling the use of smaller friction plates, or longer operation of the friction plates. The transmission has first and second input clutches alternately engagable to transfer torque to an output member along first and second input shafts, respectively, at various speed ratios dependent upon engagement of synchronizers. Thus, in any speed ratio, one of the input clutches is open and one is engaged. The method includes determining a currently established speed ratio by determining which of the input clutches and synchronizers are currently engaged and which of the input clutches and synchronizers are currently open. One of the open synchronizers is then engaged during the currently established speed ratio to cause the open input clutch to rotate at a speed greater than the speed of rotation of the engaged input clutch, thereby creating a fan cooling effect. The open synchronizer engaged to create the fan cooling effect is not being preselected for the next expected speed ratio, as operating conditions indicate that a next subsequent shift will likely be a shift to a speed ratio in which that synchronizer is not engaged.

In one embodiment, the open synchronizer that is then engaged is the synchronizer engaged in the speed ratio next highest in numerical order in comparison to the currently established speed ratio; that is, the speed ratio that is a downshift from the current speed ratio. Engaging the open synchronizer may be based on a determination that the open input clutch has a temperature greater than a predetermined temperature. Furthermore, if a shift to another one of the speed ratios next lowest in numerical order in comparison to the current speed ratio (i.e., an upshift) is expected within a predetermined period of time, the open synchronizer (e.g., the downshift synchronizer) will not be engaged.

The above features and advantages and other features and advantages of the present invention are readily apparent from the following detailed description of the best modes for carrying out the invention when taken in connection with the accompanying drawings.

DETAILED DESCRIPTION

Figure 1:
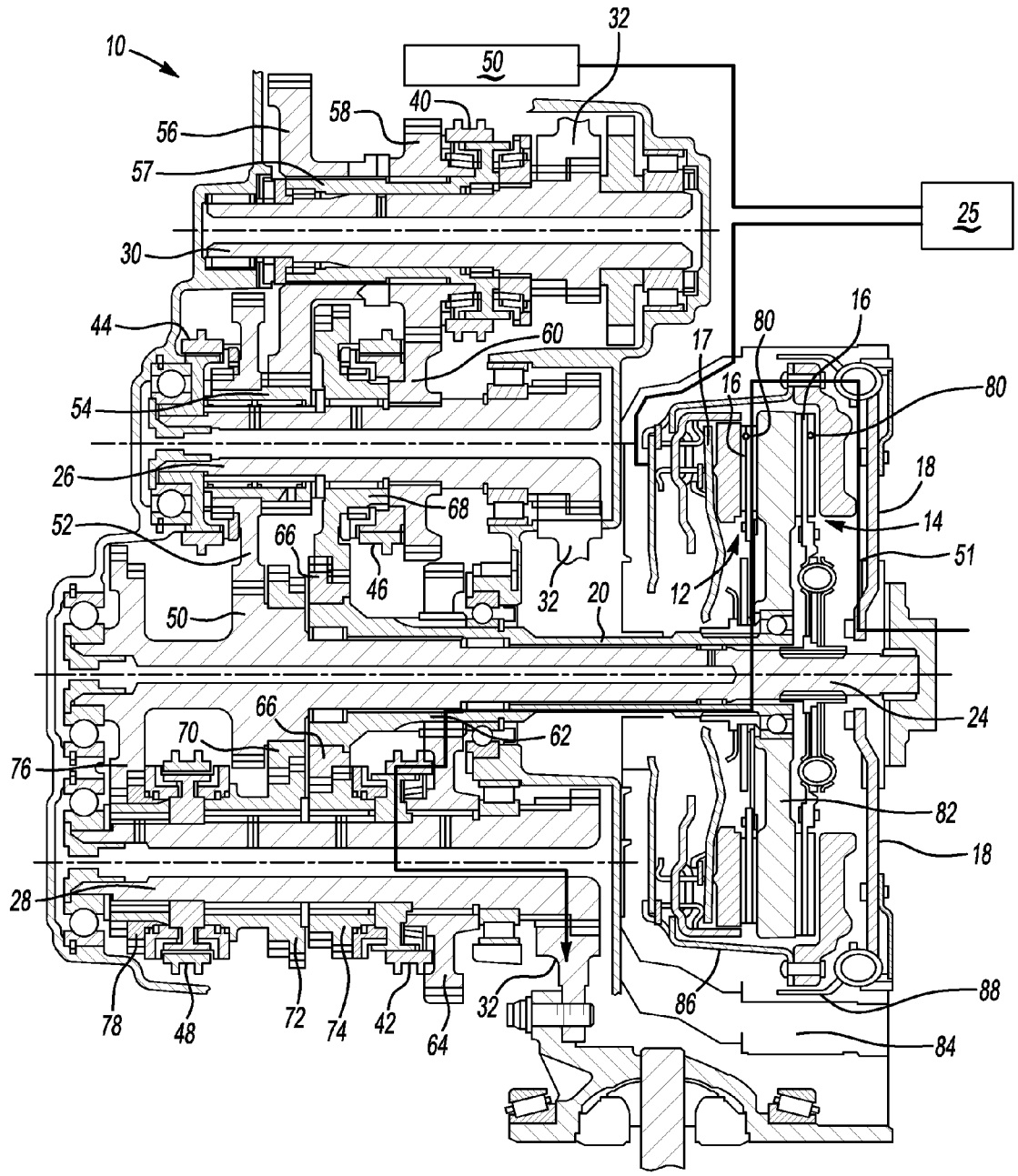
FIG. 1 is a schematic cross-sectional illustration of a dual clutch transmission with one input clutch and one synchronizer engaged to establish a speed ratio, and another synchronizer engaged to rotate the open input clutch.

Referring to the drawings, wherein like reference numbers refer to like components throughout the several views, FIG. 1 shows a dual clutch transmission 10. The dual clutch transmission 10 includes a first input clutch 12 and a second input clutch 14. The first input clutch 12 includes friction plates 16 and is selectively engagable by movement of an actuator 17 to transfer rotational motion from an engine flex plate 18 to a first input shaft 20. The second input clutch 14 also includes friction plates 16 that are selectively engagable by movement of an actuator 21 (see FIG. 2) to transfer rotational motion from the engine flex plate 18 to a second input shaft 24. The first input shaft 20 is a sleeve shaft that is concentric with the second input shaft 24. The input shafts 20, 24, are also referred to herein as input members. Activation of the actuators 17 and 21 is electronically controlled via a controller 25 that is responsive to vehicle operating conditions such as speed, accelerator input, and braking input by the vehicle operator, to determine the appropriate speed ratio, and thus the appropriately engaged input clutch 12, 14. Alternatively, the controller 25 may control the input clutches 12, 14 hydraulically via a valve body. In the embodiment shown, the input clutches 12, 14 are dry clutches, in that they are not immersed in cooling lubrication fluid but are cooled only by air.

A first countershaft 26 and a second countershaft 28 are both axially displaced from the input shafts 20, 24, as well as from a reverse shaft 30. The countershafts 26 and 28, as well as the reverse shaft 30 are meshingly engaged with an output member 32 that is connected with a final drive unit for providing tractive force to wheels of a vehicle.

Various speed ratios may be established between the input shaft 20 and the output member 32, or the input shaft 24 and the output member 32, depending on which of the input clutches 12 and 14 and which of several synchronizers 40, 42, 44, 46 and 48, are engaged. The "speed ratio" is the ratio of the speed of the output member 32 to the speed of the input member (input shaft 20 or input shaft 24). Therefore, the speed ratios decrease in numerical order as the gear states progress from first gear to seventh gear.

The synchronizers 40, 42, 44, 46 and 48 are also controlled by the controller 25 in response to the vehicle operating conditions. The controller 25 moves the synchronizers 40, 42, 44, 46 and 48 through a shift fork actuation system 50. Shift forks used to move the synchronizers 40, 42, 44, 46 and 48 are not shown for purpose of clarity in the drawings. Synchronizers 40, 42, and 48 are dual synchronizers, shiftable either to the right or to the left to establish different speed ratios, as described below, while synchronizers 44 and 46 are single synchronizers each shiftable in one direction only to establish only one speed ratio.

A first forward speed ratio, also referred to as first gear, is established by engaging second input clutch 14 and engaging synchronizer 40 (moved to the left in FIG. 1). Engine torque is transferred from the flex plate 18 to the input shaft 24, and through intermeshing gears 50, 52, 54, 56, 58 and 60 to the first layshaft 26 and output member 32. Gear 50 is connected for common rotation with input shaft 24 and meshes with gear 52 which rotates commonly about layshaft 26 with gear 54. Gear 54 meshes with gear 56, which rotates about shaft 30 and commonly with gear 58 due to engaged synchronizer 40. Gear 58 meshes with gear 60 which rotates commonly with countershaft 26 and output member 32.

A second forward speed ratio, also referred to as second gear, is established by engaging first input clutch 12 and engaging synchronizer 42 (moved to the right in FIG. 1). Engine torque is transferred from the flex plate 18 to the input shaft 20, and through intermeshing gears 62, 64 to the second layshaft 28 and output member 32. Gear 62 is connected for common rotation with input shaft 20 and meshes with gear 64. Gear 64 is connected for common rotation with second layshaft 28 due to engaged synchronizer 64. The second forward speed ratio has a lower numerical value than the first forward speed ratio (as the speed of the output member 32 is greater), and is an upshift from the first forward speed ratio. The arrow 51 in FIG. 1 indicates the powerflow path established during the second forward speed ratio.

Figure 2:
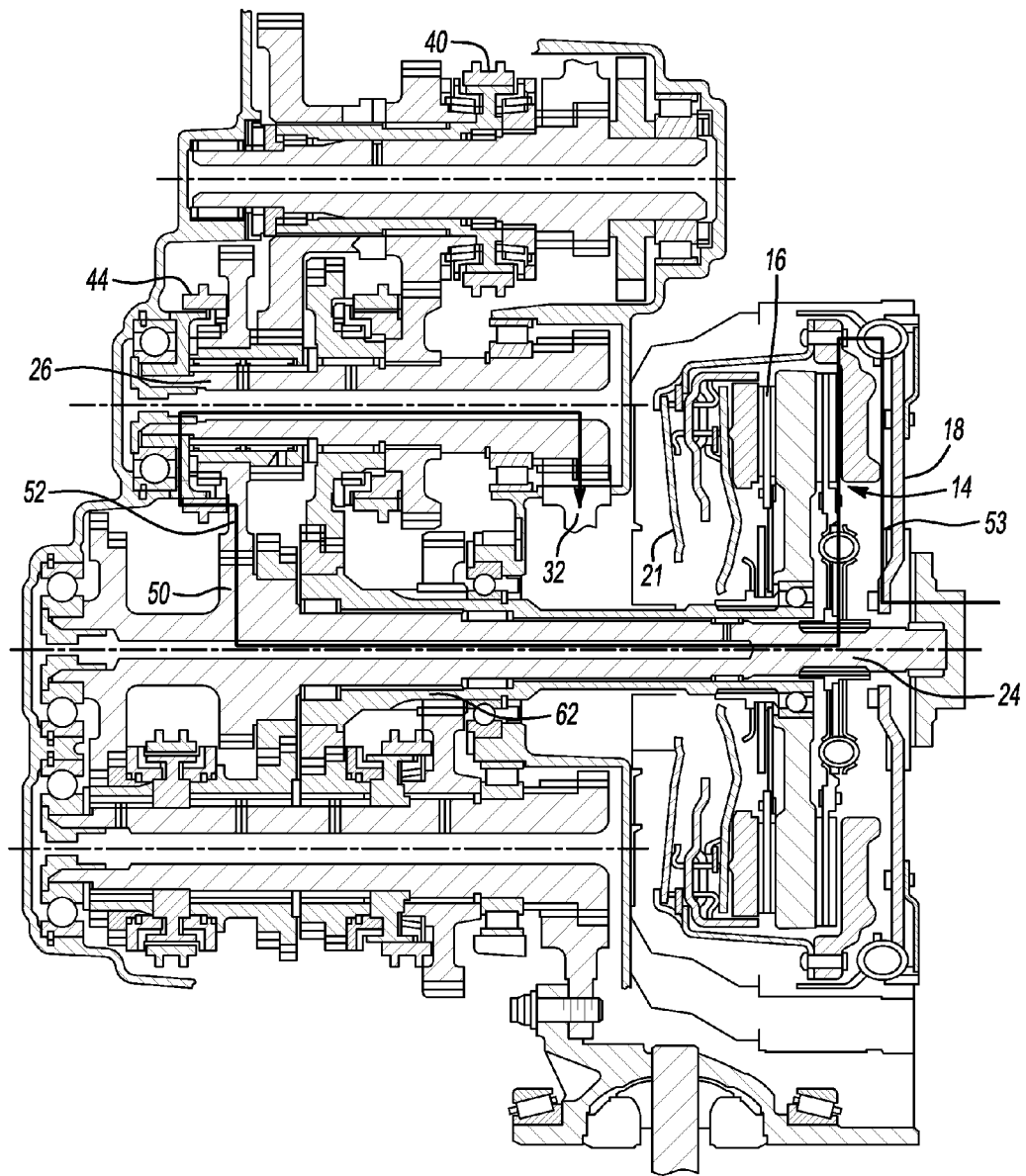
FIG. 2 is a schematic cross-sectional illustration of the dual clutch transmission of FIG. 1 with the other input clutch and another synchronizer engaged to establish another speed ratio, and still another synchronizer engaged to rotate the open input clutch.

A third forward speed ratio, also referred to as third gear, is established by engaging second input clutch 14 and engaging synchronizer 44 (moved to the right in FIG. 2). Engine torque is transferred from the flex plate 18 to the input shaft 24, and through intermeshing gears 50, 52 to the first layshaft 26 and output member 32. Gear 50 is connected for common rotation with input shaft 24 and meshes with gear 52. Gear 52 is connected for common rotation with first layshaft 26 due to engaged synchronizer 44. The third forward speed ratio has a lower numerical value than the second forward speed ratio (as the speed of the output member 32 is greater), and is an upshift from the second forward speed ratio. The arrow 53 in FIG. 2 indicates the powerflow path established during the third forward speed ratio.

A fourth forward speed ratio, also referred to as fourth gear, is established by engaging first input clutch 12 and engaging synchronizer 46 (moving it to the left from the position shown in FIG. 1). Engine torque is transferred from the flex plate 18 to the input shaft 20, and through intermeshing gears 66, 68 to the first layshaft 26 and output member 32. Gear 66 is connected for common rotation with input shaft 20 and meshes with gear 68. Gear 68 is connected for common rotation with first layshaft 26 due to engaged synchronizer 46. The fourth forward speed ratio has a lower numerical value than the third forward speed ratio (as the speed of the output member 32 is greater), and is an upshift from the third forward speed ratio.

A fifth forward speed ratio, also referred to as fifth gear, is established by engaging second input clutch 14 and engaging synchronizer 48 (by moving it to the right from the position shown in FIG. 1). Engine torque is transferred from the flex plate 18 to the input shaft 24, and through intermeshing gears 70, 72 to the second layshaft 28 and output member 32. Gear 70 is connected for common rotation with input shaft 24 and meshes with gear 72. Gear 72 is connected for common rotation with second layshaft 28 due to engaged synchronizer 48. The fifth forward speed ratio has a lower numerical value than the fourth forward speed ratio (as the speed of the output member 32 is greater), and is an upshift from the fourth forward speed ratio.

A sixth forward speed ratio, also referred to as sixth gear, is established by engaging first input clutch 12 and engaging synchronizer 42 (by moving it to the left from the position shown in FIG. 1). Engine torque is transferred from the flex plate 18 to the input shaft 20, and through intermeshing gears 66, 74 to the second layshaft 28 and output member 32. Gear 66 is connected for common rotation with input shaft 20 and meshes with gear 74. Gear 74 is connected for common rotation with second layshaft 28 due to engaged synchronizer 42. The sixth forward speed ratio has a lower numerical value than the fifth forward speed ratio (as the speed of the output member 32 is greater), and is an upshift from the fifth forward speed ratio.

A seventh forward speed ratio, also referred to as seventh gear, is established by engaging second input clutch 14 and engaging synchronizer 48 (by moving it to the left from the position shown in FIG. 1). Engine torque is transferred from the flex plate 18 to the input shaft 24, and through intermeshing gears 76, 78 to the second layshaft 28 and output member 32. Gear 76 is connected for common rotation with input shaft 24 and meshes with gear 78. Gear 78 is connected for common rotation with second layshaft 28 due to engaged synchronizer 48. The seventh forward speed ratio has a lower numerical value than the sixth forward speed ratio (as the speed of the output member 32 is greater), and is an upshift from the sixth forward speed ratio.

A reverse speed ratio is also established by engaging second input clutch 14 and engaging synchronizer 40 (by moving it to the right from the position shown in FIG. 1). Engine torque is transferred from the flex plate 18 to the input shaft 24, and through intermeshing gears 50, 52, 54 and 56 to the reverse layshaft 30 and output member 32. Gear 50 is connected for common rotation with input shaft 24 and meshes with gear 52 which rotates commonly about layshaft 26 with gear 54. Gear 54 meshes with gear 56, which rotates commonly with reverse shaft 30. Gear 56 is splined to sleeve 57 and rotates commonly with reverse layshaft 30 when sleeve 57 is connected for rotation with reverse layshaft 30 due to engaged synchronizer 40.

The controller 25 includes a stored algorithm that is operable to engage one of the synchronizers under predetermined operating conditions to cause rotation of the open input clutch for cooling the open input clutch. Temperature sensors 80 are operatively connected to the friction plates 16 and to the controller 25 (connection to the controller 25 not shown for clarity in the drawings). The stored algorithm is a method of cooling a dual clutch transmission 100 shown as a flow diagram in FIG. 3. The method 100 begins with block 102, in which the controller 25 monitors operating parameters such as the temperature of the friction plates 16 of the input clutches 12, 14 using sensors 80. The temperature of the friction plates 16 may alternatively be indirectly predicted based on other operating parameters, such as the length of time that the input clutch 12 or 14 has been engaged, the engine speed, the shift history, etc. Other operating parameters monitored in block 102 may include engine speed, engine load, and operator input measured at the accelerator pedal or brake pedal.

In block 104, the algorithm then determines the currently established speed ratio by monitoring the state (open or engaged) of each of the input clutches 12, 14 and the synchronizers 40, 42, 44, 46 and 48. In block 106, the algorithm determines whether the temperature of either of the input clutches 12 and 14 is greater than a predetermined temperature at which it has been determined that cooling of the friction plates 16 according to the method 100 would be advantageous. If the temperature of either input clutch 12 or 14 is greater than the predetermined temperature, then in preparation for cooling the input clutch 12 or 14, the algorithm first determines in block 108 what the next speed ratio is likely to be. Based on operating parameters such as engine speed, engine load, and operator input measured at the accelerator pedal or a brake pedal, etc.

Furthermore, in block 110, the algorithm determines whether a shift to a subsequent speed ratio is expected within a predetermined amount of time. For purposes of cooling the input clutches 12, 14, it is beneficial to engage a synchronizer that is engaged in the next highest speed ratio in comparison with the current speed ratio. That is, it is most advantageous to engage the synchronizer that would be engaged in a downshift from the currently established speed ratio. This is because, as explained with respect to the specific descriptions of the method 100 as applied to the transmission 10 below, engaging the synchronizer that would be engaged in a downshift from the currently established speed ratio will cause the open input clutch to rotate at a speed of rotation greater than the speed of rotation of the engaged input clutch, creating a fan cooling effect.

Accordingly, block 110 may be determining in particular whether an upshift from the currently established speed ratio is expected within a predetermined amount of time. If such an upshift is expected within a predetermined amount of time, then it is not an ideal time for cooling the open input clutch, and the method 100 returns to block 102. However, if such an upshift is not expected within the predetermined amount of time, then in block 112 one of the open synchronizers will be engaged during the currently established speed ratio (i.e., without disengaging the engaged input clutch and synchronizer). It is advantageous if the open synchronizer that is engaged is the synchronizer engaged in a downshift to the next highest numerical order speed ratio from the currently established speed ratio. In fact, the open synchronizer that is engaged in block 112 is not the synchronizer that is engaged in the next likely speed ratio determined in block 108. Thus, the open synchronizer engaged in block 112 is not a preselection of the synchronizer that will be engaged in the next speed ratio to be established. With the synchronizer engaged in block 112, the open input clutch 12 or 14 will rotate at a speed greater than the rotational speed of the closed input clutch, functioning as a fan to cool the friction plates 16 of both of the input clutches 12, 14.

After block 112, the algorithm continues to monitor operating conditions, and if it is determined by the algorithm in block 114 that a shift is commanded, and the shift is not to a speed ratio that requires the synchronizer engaged in block 112 to be engaged, then the synchronizer engaged in block 112 is now released. Based on blocks 108, 110 and 112, it would not be expected that the next commanded shift would require engagement of the synchronizer engaged in block 112. However, in the period of time since the determinations of blocks 108 and 110 were made, operating conditions may have changed so that the synchronizer engaged in block 112 is now in fact the synchronizer that is to be engaged in the commanded shift. In that case, the synchronizer would not be released in block 114.

In block 116, the algorithm monitors the temperature of the input clutches 12 and 14 that are being cooled per the engagement of the synchronizer under block 112. The friction plates 16 of the engaged input clutch 12 or 14 are likely to have a higher temperature than the open input clutch. If the algorithm determines that the temperature of the friction plates 16 has fallen below the predetermined temperature of block 106, then the synchronizer engaged in block 112 is released in block 118. Alternately, the temperature at which the synchronizer engaged in block 112 is released may be a temperature even lower than the predetermined temperature of block 106, in order to ensure that the friction clutches 16 stay below the predetermined temperature 106 for a longer time period.

Referring to FIG. 1, the method 100 is now described with respect to the engagement status of the transmission 10 shown in FIG. 1. In FIG. 1, input clutch 12 and synchronizer 42 are engaged to establish the second forward speed ratio. Under the method 100, it has been determined in block 106 that the temperature of the friction plates 16 of the one of the input clutches 12 or 14 has risen above the predetermined temperature. It has also been determined in block 108 what the next likely shift speed ratio will be. Synchronizer 40 has been engaged by shifting it to the left. Synchronizer 40 is engaged in this manner in the first forward speed ratio. In block 108, it was determined that the first forward speed ratio is not the next likely speed ratio that will be established. Because the second forward speed ratio is established, and the input clutch 14 is open, engaged synchronizer 40 now causes input clutch 14 to rotate at a greater speed than the speed of rotation of the engaged input clutch 12. This is due to the speed of the output member 32 established at the second layshaft 28 in the second forward speed ratio and now operatively connected to the first layshaft 26 and to the second input shaft 24 through the engaged synchronizer 40 and intermeshing gears 50, 52, 54, 56, 58 and 60. Synchronizer 40 will remain engaged until it is determined in block 114 that another shift is commanded that does not require engagement of synchronizer 40, or until it is determined in block 116 that the temperature of the friction plates 16 of the input clutches 12 and 14 have fallen below the predetermined temperature or other selected temperature. In either of these events, the synchronizer 40 will be released in block 118. If another shift is commanded the synchronizer and clutch necessary to establish that speed ratio are engaged and the shift is accomplished in block 120. The open clutch 14 can also be made to rotate at a speed greater than the closed input clutch 12 when the transmission 10 is in the fourth forward speed ratio or in the sixth forward speed ratio by engaging the synchronizer engaged in the speed ratio with the next highest numerical value (i.e., engage synchronizer 44 when in the fourth forward speed ratio or engage synchronizer 48 (moved to the right) when in the sixth forward speed ratio).

The method 100 can also be performed during the third forward speed ratio by engaging synchronizer 44 to cause open input clutch 12 to rotate at a speed greater than the speed of the engaged input clutch 14, creating a fan cooling effect. Further, the open input clutch 12 can also be made to rotate at a speed greater than the closed input clutch 14 when the transmission 10 is in the fifth forward speed ratio or in the seventh forward speed ratio by engaging the synchronizer engaged in the speed ratio with the next highest numerical value (i.e., engage synchronizer 46 when in the fifth forward speed ratio or engage synchronizer 42 (moved to the left) when in the seventh forward speed ratio).

Figure 3:
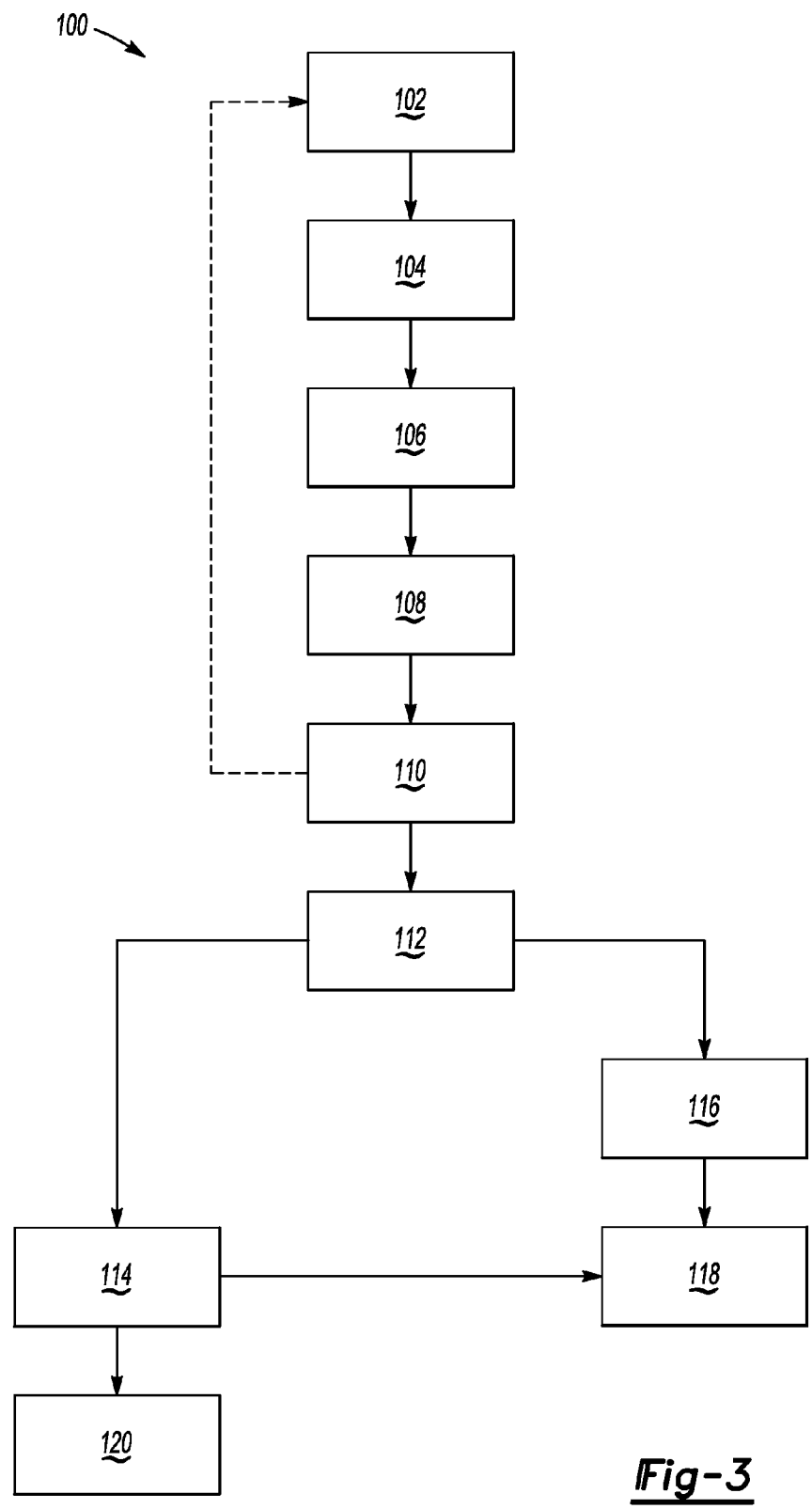
FIG. 3 is a flow diagram of a method of cooling the dual clutch transmission of FIGS. 1 and 2.

In addition to the controller 25 controlling engagement of the synchronizers 40, 42, 44, 46 and 48 according to the method 100 of FIG. 3, the input clutches 12, 14 and other structure can be modified to optimize cooling of the input clutches 12 and 14. For example, grooves in the friction plates 16 can be optimized using computational fluid dynamics. Cross-drilled holes can also be added to each of the apply plates shown in FIG. 3 on either side of the friction plates 16, the center plate 82, or both. Referring to FIG. 1, the shape and openings in the center plate 82 and the center hub of each friction plate 16 can be optimized using computational fluid dynamics to create air flow for cooling. The shape of the outer housing 84 and the cover 86 of the input clutches 12, 14 can be optimized using computational fluid dynamics, as can the center hub of the flex plate 18. Grooves can be added to the top portion 88 of the flex plate 18, and the shape of the top portion 88 can be optimized using computational fluid dynamics to help create a fan cooling effect.

While the best modes for carrying out the invention have been described in detail, those familiar with the art to which this invention relates will recognize various alternative designs and embodiments for practicing the invention within the scope of the appended claims.

The invention claim is:

1. A method of cooling a dual clutch transmission having first and second input clutches alternately engagable to transfer torque to an output member along first and second input shafts, respectively, at various speed ratios dependent upon engagement of synchronizers, comprising:
   determining a currently established speed ratio by determining which of the input clutches and synchronizers are currently engaged and which of the input clutches and synchronizers are currently open;
   engaging one of the open synchronizers during the currently established speed ratio to cause the input clutch that is open to rotate at a speed greater than the speed of rotation of the input clutch that is engaged, thereby creating a fan cooling effect; and wherein operating conditions indicate that a next subsequent shift will likely be a shift to one of the speed ratios in which the one of the open synchronizers is not engaged.

2. The method of claim 1, further comprising:
   determining that one of the input clutches has a temperature greater than a predetermined temperature prior to engaging the one of the open synchronizers.

3. The method of claim 2, further comprising:
   releasing the synchronizer that causes the open input clutch to rotate if the temperature of the one of the input clutches falls below the predetermined temperature or another predetermined temperature.

4. The method of claim 1, further comprising:
   determining whether a shift to another one of the speed ratios next lowest in numerical order in comparison to the current speed ratio is expected within a predetermined period of time; and wherein said engaging one of the open synchronizers occurs only if the shift is not expected within the predetermined period of time.

5. The method of claim 1, further comprising:
   determining whether a shift to a different one of the speed ratios is commanded;
   releasing the synchronizer that causes the open input clutch to rotate if the commanded shift to the different one of the speed ratios does not require engagement of the synchronizer that causes the open input clutch to rotate; and
   shifting to the different one of the speed ratios.

6. The method of claim 1, wherein the one of the open synchronizers that is engaged to cause rotation of the open input clutch is also engaged to establish the one of the speed ratios next highest in numerical order in comparison to the currently established speed ratio.

7. A method of cooling a dual clutch transmission comprising:
   monitoring an operating parameter indicative of temperature of a first input clutch and of a second input clutch; wherein the first and the second input clutches are alternately engagable to provide power flow from an input member to an output member at multiple speed ratios established by engagement of various synchronizers;
   determining which one of the speed ratios is currently established by determining which of the input clutches and which of the synchronizers are currently engaged;
   engaging another one of the synchronizers used to establish another one of the speed ratios next highest in numerical order in comparison to the currently established speed ratio if the monitored operating parameter is greater than a predetermined value while maintaining engagement of the input clutch and synchronizers of the currently established speed ratio, thereby causing the one of the first and the second input clutches that is not engaged to rotate at a speed determined by the currently established speed ratio, creating a fan cooling effect; and wherein operating conditions indicate that a subsequent shift will likely be a shift to one of the speed ratios in which the one of the open synchronizers is not engaged.

8. The method of claim 7, further comprising:
   determining whether a shift to another one of the speed ratios next lowest in numerical order in comparison to the currently established speed ratio is expected within a predetermined period of time; and wherein said engaging another one of the synchronizers used to establish said another one of the speed ratios next highest in numerical order occurs only if the shift to another one of the speed ratios next lowest in numerical order is not expected within the predetermined period of time.

9. The method of claim 7, further comprising:
   determining whether a shift to a different one of the speed ratios is expected within a predetermined period of time;
   releasing said another one of the synchronizers used to establish said another one of the speed ratios next highest in numerical order if the shift to the different one of the speed ratios is expected within the predetermined period of time; and
   shifting to the different one of the speed ratios.

10. The method of claim 7, further comprising:
    releasing said another one of the synchronizers used to establish said another one of the speed ratios next highest in numerical order if the monitored operating parameter falls below one of the predetermined value or another predetermined value.

11. A method of cooling a dual clutch transmission having first and second input clutches alternately engagable to transfer torque to an output member along first and second input shafts, respectively, at various speed ratios dependent upon engagement of synchronizers, comprising:
    determining a currently established speed ratio by determining which of the input clutches and synchronizers are currently engaged and which of the input clutches and synchronizers are currently open; and
    during the currently established speed ratio, engaging one of the open synchronizers that is normally engaged in a downshift from the currently established speed ratio, thereby causing the open input clutch to rotate at a speed greater than the speed of rotation of the engaged input clutch, creating a fan cooling effect; wherein operating conditions indicate that a next subsequent shift will likely be an upshift to one of the speed ratios in which the one of the open synchronizers is not engaged; and wherein structure of the input clutches is determined using computational fluid dynamics to enhance the fan cooling effect.

* * * * *